United States Patent

Cohen

[15] 3,697,748

[45] Oct. 10, 1972

[54] PLASMA CHROMATOGRAPH WITH INTERNALLY HEATED INLET SYSTEM

[72] Inventor: Martin J. Cohen, West Palm Beach, Fla.

[73] Assignee: Franklin GNO Corporation, West Palm Beach, Fla.

[22] Filed: Oct. 6, 1969

[21] Appl. No.: 864,046

Related U.S. Application Data

[63] Continuation-in-part of Ser. No. 779,096, Nov. 26, 1968.

[52] U.S. Cl.....250/41.9 TF, 250/41.9 G, 250/41.9 S
[51] Int. Cl. .........................H01j 39/34, B01d 59/44
[58] Field of Search...................................250/41.9 S

[56] References Cited

UNITED STATES PATENTS 2,699,505   1/1955   Usher et al. ..............250/41.9
3,211,996   10/1965  Fox et al...................250/41.9
3,502,868   3/1970   Gentsch....................250/41.9
3,254,209   5/1966   Fite.....................250/41.9 SE

FOREIGN PATENTS OR APPLICATIONS 968,912   9/1964   Great Britain............250/41.9

OTHER PUBLICATIONS

" Device for Mass Spectrometer Heated Inlet System," E. Rowe, B. F. Goodrich, June 28, 1957.

Primary Examiner—James W. Lawrence
Assistant Examiner—C. E. Church
Attorney—Raphael Semmes

[57] ABSTRACT

Response time of drift-cell apparatus for measuring trace gases is improved by heating the drift cell walls and/or the sample inlet to reduce the accumulation of sample substances. Heated filters and electrode structures with tortuous gas paths are also disclosed.

8 Claims, 2 Drawing Figures

PATENTED OCT 10 1972　　　　　　　　　　　　　　　　　　　　　3,697,748

INVENTOR
MARTIN J. COHEN

BY　*Raphael Semmes*

ATTORNEY

PLASMA CHROMATOGRAPH WITH INTERNALLY HEATED INLET SYSTEM

REFERENCE TO COPENDING APPLICATION

This application is a continuation-in-part of Ser. No. 779,096, filed Nov. 26, 1968 for "Apparatus and Methods for Separating, Detecting, and Measuring Trace Gases in the Presence of Moisture."

BACKGROUND OF THE INVENTION

This invention relates to apparatus and methods for performing measurements upon gaseous samples and more particularly is concerned with improving the response time of trace gas measurement apparatus and methods.

The aforesaid copending application discloses trace gas measurement apparatus and methods in which the effects of moisture in the sample are significantly reduced by diluting the sample with dry air. While that application is principally concerned with reducing moisture-produced interference, the system disclosed in the application includes heating means for the measurement chamber and gas inlet.

BRIEF DESCRIPTION OF THE INVENTION

The present invention is concerned with the utilization of heat to improve the response time of measurements performed upon gaseous samples, and it is accordingly a principal object of the invention to provide apparatus and methods for such purposes.

Briefly stated, typical embodiments of the invention employ a "Plasma Chromatograph" drift cell, referred to more fully hereinafter, which receives a gaseous sample through an inlet. The cell chamber and/or the inlet are heated to reduce wall adsorption of the sample substances. In one form of the invention, a heated filter is also provided, while in another form of the invention, heated gas is employed to raise the temperature of an electrode within the cell.

BRIEF DESCRIPTION OF THE DRAWING

The invention will be further described in conjunction with the accompanying drawing, which illustrates preferred and exemplary embodiments, and wherein.

DETAILED DESCRIPTION OF THE INVENTION

Before the invention is described in detail, reference will be made to the subject of "Plasma Chromatography," which is disclosed more fully, for example, in the copending application of Martin J. Cohen, David I, Carroll, Roger F. Wernlund, and Wallace D. Kilpatrick Ser. No. 777,964, filed Oct. 23, 1968, and entitled "Apparatus and Methods for Separating, Concentrating, Detecting, and Measuring Trace Gases." The Plasma Chromatography system involves the formation of primary or reactant ions and the reaction of such primary ions with molecules of trace substances to form secondary or product ions, which may be concentrated, separated, detected, and measured by virtue of the difference of velocity or mobility of the ions in an electric field. The primary ions may be produced by subjecting the molecules of a suitable host gas, such as air, to ionizing radiation, such as beta rays from a tritium source, corona from a multi-point or wire array, electrons produced by photoemission from a cathode, etc. The primary ions are subjected to an electric drift field, causing them to migrate in a predetermined direction through a reaction space into which the sample or trace gas is introduced. The resultant collisions between primary ions and trace gas molecules produce secondary ions of the trace gas in much greater numbers than can be produced by mere electron attachment to the trace gas molecules. Secondary ions are also subjected to the electric drift field and may be sorted in accordance with their velocity or mobility.

Figure 1:
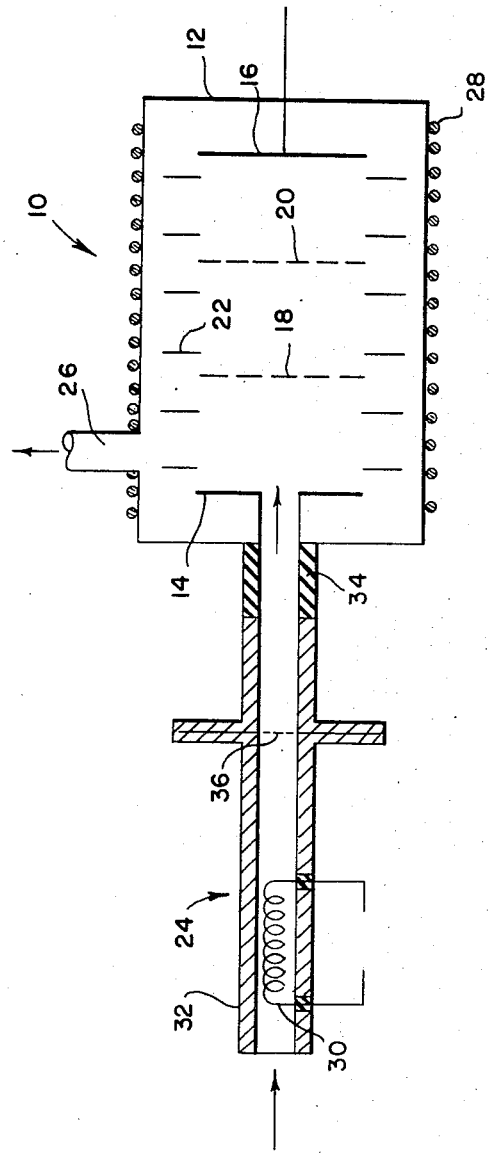
FIG. 1 is a diagrammatic longitudinal sectional view of one form of the invention.

Referring to FIG. 1 of the drawing, reference numeral 10 designates generally a Plasma Chromatography cell of the type disclosed in the aforesaid copending applications. The cell comprises an envelope 12 enclosing a series of electrodes, which may be of parallel plane geometry. Principal electrodes 14 and 16 may be arranged adjacent to opposite ends of the envelope, which may be a circular cylinder, for example. When the apparatus is used to detect negative ions, as will be assumed for example, electrode 14 will be a cathode and electrode 16 an anode. When the apparatus is used to detect positive ions, the polarities will be reversed. The cell preferably includes a pair of shutter grids or ion gates 18 and 20, each of which may comprise two sets of interdigitated parallel wires, alternate wires of each grid being connected together to form the two sets. Cathode 14 or the region of the envelope near this electrode is provided with ionizing means, which may be of the type mentioned previously. Anode 16 may be a collector plate connected to an output device, such as an electrometer, which may be Carry Instruments Model 401 (vibrating reed) type with current sensitivity of $10^{-15}$ amps. at a time constant of 300 milliseconds.

An electric drift field is provided between the principal electrodes 14 and 16. This field may be obtained, for example, from a suitable DC power supply, such as a battery connected across a series-resistor voltage-divider chain. The positive terminal of the chain may be connected to ground and the negative terminal to the cathode 14. Anode 16 may be connected to ground through the input circuit of the electrometer. Taps on the voltage divider may be connected to a series of guard rings 22 spaced along the length of the envelope 12 to maintain the uniformity of the drift field.

Adjacent elements of each shutter grid are normally maintained at equal and opposite potentials relative to a grid average potential established by the voltage divider. Under these conditions, the grid or gate is closed to the passage of electrically charged particles. The potential sources which provide the equal and opposite potentials just referred to may be part of grid drive circuits for applying grid opening pulses to the grids 18 and 20. The grids are opened by driving the adjacent elements of each grid to the same potential, the grid average potential, at predetermined instants.

A sample comprising a suitable host gas, such as air, carrying an appropriate gaseous trace substance, such as triethyl phosphite, flows into the envelope by means of a gas inlet pipe 24 and flows out of the envelope by means of gas outlet pipe 26. Any suitable source of flow pressure, such as a fan or pump, may be employed to move the gaseous sample. The sample may enter the envelope through an aperture in cathode 14. In the region between the cathode 14 and the first grid 18 primary ions of the carrier gas, or one or more of the main constituents thereof, such as oxygen, are formed under the influence of the ionizing means in this region. For example, negative oxygen ions may be formed at cathode 14, as by direct attachment of electrons to the oxygen molecules, the sample being subjected to beta rays produced by a tritium foil on the cathode.

The primary ions drift toward the anode 16, and in the reaction space between the cathode and the first shutter grid 18, the primary ions encounter other molecules (at the rate of $10^{11}$ per second in air at atmospheric pressure). A majority of these collisions will be with oxygen, nitrogen, or other non-reactive molecules. A small fraction of the collisions will be with the trace molecules of interest. In these cases, the primary ions will interact with the trace molecules to form secondary ions. Secondary ions will have, in general, an appreciable difference in mobility from the primary ions. The pressure in the chamber 12 is maintained at a level (preferably about atmospheric) which ensures that the mean free path of ions in the reaction region is short compared to the dimensions of this region, so that ion-molecule collisions are promoted.

The ion flux at the first shutter grid 18 will consist of primary ions and possibly several species of secondary ions. A sample of this mixed ion population is periodically admitted to the drift region between the first and second shutter grids when the first shutter grid 18 is opened by momentarily driving all of the grid wires to the grid average potential. The second shutter grid 20 is opened for a predetermined interval at a predetermined time after the opening of the first grid. The ions that pass through the second grid drift toward and are collected by the anode 16. The resultant output current may be integrated over several cycles to give a measurable current. By scanning the time of opening of the second grid relative to the first, a drift time spectrum of the ion population can be obtained in the output and recorded (current v. drift time). This permits the various ion species to be separated and identified.

Since the details of the Plasma Chromatograph and its operation are not per se the present invention, the foregoing description will suffice as exemplary of the type of instruments to which the present invention may be applied. The present invention is specifically concerned with enhancing the measurements by ensuring rapid response. It has been found that response time is increased by the accumulation of sample substances (e.g., trace gas adsorption) on the walls of the chamber 12 and the inlet 24. It has also been discovered that such accumulation can be reduced to acceptable levels by the application of heat. In the embodiment of FIG. 1, heat is applied to the chamber 12 by means of an electric heater 28 wound helically about the chamber, although the particular heating means shown is merely representative. If desired, insulation may be applied about the heater to retain the heat. By this means, the chamber may be operated at a temperature of from approximately 100° to 200° C., for example, thereby to avoid the accumulation of relatively low volatility substances within the chamber.

To avoid an accumulation of sample material upon the walls of the inlet pipe 24 (which would increase response time), the inlet is also heated. This also permits the entire cell to operate under isothermal conditions and prevents the cooling of the chamber which would result from the admission of cool gas. Heating may be accomplished by heating the incoming gas itself by any suitable means, such as an electric heater 30 inserted in the inlet pipe 24. It is desirable to have turbulent flow, no heater hot spots, and good heat transfer. An insulated pipe section, such as Teflon or quartz, beyond the heated portion will preserve the gas temperature. Such a pipe section is indicated diagrammatically at 34. A fine bore inlet tubing to meet the Reynolds condition for turbulent flow and/or heated obstructions in the tube (such as the heater itself) yield good heat transfer. For particulate filtering purposes, an inlet pipe including a filter 36 is necessary. The filter must be heated (as by heat transfer from the heated section 32 or from the heated gas) to avoid sample hold-up. Renewal of the filter can be done by rotating a fresh filter into position in the inlet pipe periodically. Typical filters may be made of Teflon, such as Millipore Corporation Type LS (good to 250° C.) or Soloinert Brand Type UG (good to 200° C.).

Figure 2:
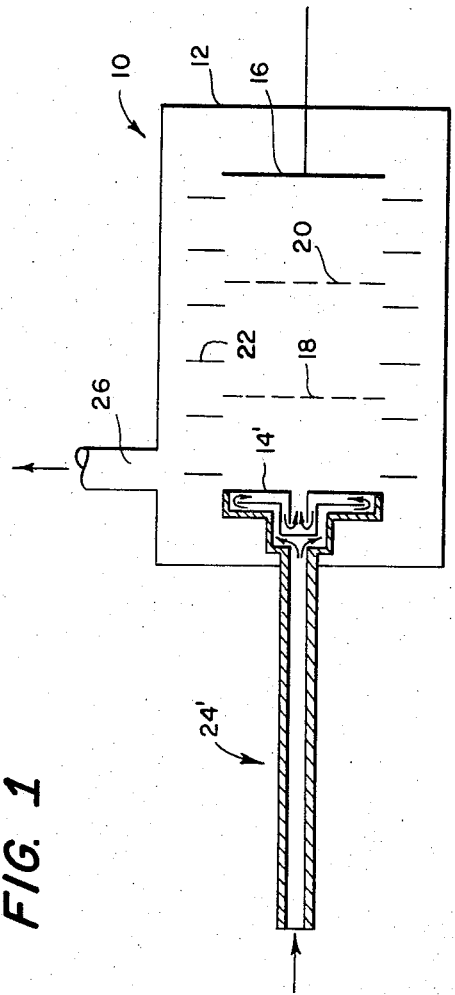
FIG. 2 is a similar view of another form of the invention.

If a cold (e.g., room temperature) Plasma Chromatography chamber is employed, then the principal electrode adjacent to the ionizer (for example, the cathode electrode) should be heated. This concept is illustrated in FIG. 2, wherein the same reference numerals applied in FIG. 1 are used to designate corresponding parts. The temperature of cathode 14' of the Plasma Chromatograph is raised by heat transfer from the heated gas applied through the inlet 24'. Any suitable means (such as the electric heater 30 of FIG. 1) may be employed to heat the gas. The cathode structure provides a tortuous or re-entrant path for the flow of heated gas to facilitate the heat transfer. The cathode structure may include an insulating wall adjacent to the inlet, and the re-entrant path may be defined by thin conductive sheets of copper or silver, for example, the sheet closest to the first grid being a radioactive source. An advantage to using the sample gas to heat the cathode is that high voltage insulation, which makes for poor thermal conduction and would be required for direct electric heating of a high potential cathode from a grounded power circuit, is avoided.

While preferred embodiments of the invention have been shown and described, it will be apparent to those skilled in the art that changes can be made without departing from the principles and spirit of the invention. For example, special materials having low reactivity, such as Teflon, may be employed in the chamber construction, as well as the inlet tube.

The invention claimed is:

1. A method of detecting a trace substance in a gaseous sample, which comprises introducing said sample into a chamber through an inlet pipe, heating said sample from within said inlet pipe, providing reactant ions in said chamber, reacting said ions with molecules of said sample in said chamber to produce product ions of different mobility, applying a drift field to the ions in said chamber, maintaining the pressure in said chamber at a level such that the length of the mean free path of said ions is substantially less than the dimensions of said chamber, segregating said ions in said chamber in accordance with their mobility, and detecting at least a portion of the segregated ions.

2. A method in accordance with claim 1, wherein said chamber is heated during the foregoing steps.

3. A method in accordance with claim 2, wherein the chamber is heated to a temperature of from approximately 100° C. to approximately 200° C.

4. A method in accordance with claim 1, wherein the sample is caused to flow through said pipe under turbulent flow conditions.

5. A method in accordance with claim 1, wherein the heated sample is passed through a filter for removing particulates from said sample before the same is introduced into said chamber and heat is transferred from said sample to said filter for elevating the temperature of the latter.

6. Apparatus for detecting a trace substance in a gaseous sample by ion analysis, comprising a chamber having a pair of electrodes spaced apart therein, means for introducing said sample into said chamber, means adjacent to one of said electrodes for providing reactant ions to form product ions of different mobility by reaction of said reactant ions with molecules of said sample, means for applying a drift field between said electrodes for causing said ions to drift toward the other electrode, means for maintaining the pressure in said chamber at a level such that the length of the mean free path of said ions is substantially less than the dimensions of said chamber, means for segregating said ions in said chamber in accordance with their mobility in the drift field, and means for providing an electrical output from said other electrode in response to at least a portion of the segregated ions, said means for introducing said sample into said chamber comprising an inlet pipe having means inside the pipe for heating the sample from within the pipe.

7. Apparatus for detecting a trace substance in a gaseous sample by ion analysis, comprising a chamber having a pair of electrodes spaced apart therein, means for introducing said sample into said chamber, means adjacent to one of said electrodes for providing reactant ions to form product ions of different mobility by reaction of said reactant ions with molecules of said sample, means for applying a drift field between said electrodes for causing said ions to drift toward the other electrode, means for maintaining the pressure in said chamber at a level such that the length of the mean free path of said ions is substantially less than the dimensions of said chamber, means for segregating said ions in said chamber in accordance with their mobility in the drift field, and means for providing an electrical output from said other electrode in response to at least a portion of the segregated ions, said means for introducing said sample into said chamber comprising an inlet pipe with a filter therein and means within said means for introducing said sample for heating said filter.

8. Apparatus for detecting a trace substance in a gaseous sample by ion analysis, comprising a chamber having a pair of electrodes spaced apart therein, one of said electrodes having a plurality of spaced walls defining a tortuous path through the electrode, means for introducing said sample into said chamber along said tortuous path, means adjacent to said one electrode for providing reactant ions to form product ions of different mobility by reaction of said reactant ions with molecules of said sample, means for applying a drift field between said electrodes for causing said ions to drift toward the other electrode, means for maintaining the pressure in said chamber at a level such that the length of the mean free path of said ions is substantially less than the dimensions of said chamber, means for segregating said ions in said chamber in accordance with their mobility in the drift field, means for providing an electrical output from said other electrode in response to at least a portion of the segregated ions, and means for heating the sample before introduction into said chamber, whereby the heat is transferred from said sample to said one electrode.

* * * * *